(12) United States Patent
Gitt (10) Patent No.: US 7,448,290 B2
(45) Date of Patent: Nov. 11, 2008

(54) TWIN-CLUTCH TRANSMISSION (75) Inventor: Carsten Gitt, Stuttgart (DE)

(73) Assignee: Daimler AG, Stuttgart (DE)

( * ) Notice: Subject to any disclaimer, the term of this patent is extended or adjusted under 35 U.S.C. 154(b) by 222 days.

(21) Appl. No.: 11/295,734

(22) Filed: Dec. 6, 2005

(65) Prior Publication Data

US 2006/0117882 A1    Jun. 8, 2006

Related U.S. Application Data

(63) Continuation-in-part of application No. PCT/EP2004/005920, filed on Jun. 1, 2004.

(30) Foreign Application Priority Data

Jun. 6, 2003    (DE)    ................ 103 25 647

(51) Int. Cl.
*F16H 3/08*    (2006.01)
*F16H 3/38*    (2006.01)

(52) U.S. Cl. .......................... 74/331; 74/340
(58) Field of Classification Search .................. 74/329, 74/330, 331, 340
See application file for complete search history.

(56) References Cited

U.S. PATENT DOCUMENTS

| | | | |
|---|---|---|---|
| 2,543,412 A | 2/1951 | Kregesses | |
| 3,046,807 A | 7/1962 | Barth et al. | |
| 3,425,290 A | 2/1969 | Perkins | |
| 4,375,171 A | 3/1983 | Morscheck | |
| 4,452,094 A | 6/1984 | Schetter | |
| 4,614,133 A | 9/1986 | Nerstad et al. | |
| 5,366,422 A * | 11/1994 | Dye et al. | 475/249 |
| 5,367,914 A | 11/1994 | Ordo | |
| 5,592,854 A * | 1/1997 | Alfredsson | 74/331 |
| 6,050,152 A * | 4/2000 | Alfredsson | 74/325 |
| 6,209,407 B1 * | 4/2001 | Heinzel et al. | 74/331 |
| 6,250,171 B1 | 6/2001 | Sperber et al. | |
| 6,427,547 B1 | 8/2002 | Bowen | |
| 6,666,103 B2 * | 12/2003 | Gotoh | 74/412 R |
| 6,755,089 B2 * | 6/2004 | Hirt | 74/329 |
| 6,820,512 B2 * | 11/2004 | Hedman | 74/330 |
| 2004/0144190 A1 * | 7/2004 | Hall, III | 74/331 |

FOREIGN PATENT DOCUMENTS

| | | |
|---|---|---|
| DE | 958 081 | 2/1957 |
| DE | 2 344 797 | 3/1974 |

(Continued)

OTHER PUBLICATIONS

Prof. Dr. Peter Tenberge, "Doppelkupplungsgetriebe in Windungsanordnung".

(Continued)

*Primary Examiner*—Roger Pang
(74) *Attorney, Agent, or Firm*—Klaus J. Bach (57) ABSTRACT

In a twin-clutch transmission, in a first forward gear, the drive torque is transferred by an interconnection of a first transmission part having one countershaft and a second part transmission having another countershaft by means of an intermediate stage whose gearwheels can be used multi-functionally in connection with additional forward gears of the transmission thereby providing for a relatively small transmission with a relatively large number of transmission ratios.

11 Claims, 6 Drawing Sheets

FOREIGN PATENT DOCUMENTS

| | | |
|---|---|---|
| DE | 198 21 164 | 11/1991 |
| DE | 197 55 432 | 6/1999 |
| DE | 198 60 251 | 11/2000 |
| DE | 101 36 231 | 2/2001 |
| DE | 199 39 334 | 3/2001 |
| DE | 100 60 699 | 6/2001 |
| DE | 101 02 028 | 8/2001 |
| DE | 101 08 881 | 9/2001 |
| DE | 100 15 336 | 10/2001 |
| DE | 101 21 634 | 11/2001 |
| EP | 0 354 890 | 2/1990 |
| WO | WO 94/07055 | 3/1994 |
| WO | WO 00/39484 | 7/2000 |

OTHER PUBLICATIONS

Tenberge et al., "Stufenloses Fahrzeuggetriebe Mit Electrisher Leistungsverzweigung", 1997, Konferenz-Einzelbericht:VDI-Berichte.

\* cited by examiner

Fig. 1

|  | 13 | | 32 | | | 21 | | 29 | | | 36 | | |
|---|---|---|---|---|---|---|---|---|---|---|---|---|---|
|  | K1 | K2 | S1 | | S2 | S3 | | S4 | S5 | | S6 | S7 | | S8 |
| R2 |  | ◉ |  | ● |  | ● |  |  |  |  | ● |  | ● |  |
| R1 |  | ◉ |  | ● |  |  |  | ● |  |  | ● |  | ● |  |
| V1 | ◉ |  |  |  | ● |  |  | ● | ● |  |  |  |  | ● |
| V2 |  | ◉ |  |  | ■ |  |  | ■ |  |  | ● |  |  | ● |
| V3 | ◉ |  |  | ● |  |  |  | ● |  |  | ● |  | ● |  |
| V4 |  | ◉ |  | ● |  |  | ● |  | ● |  |  |  | ● |  |
| V5 | ◉ |  |  | ● |  |  | ● |  |  |  | ● |  | ● |  |
| V6 |  | ◉ | ● |  |  |  | ● |  |  |  | ● |  | ● |  |
| V7 | ◉ |  | ■ |  |  |  | ● |  |  |  | ● | ● |  |  |

| | 13 | | 70 | | 21 | | 29 | | 36 | |
|---|---|---|---|---|---|---|---|---|---|---|
| | K1 | K2 | S1 | S2 | S3 | S4 | S5 | S6 | S7 | S8 |
| R | ◉ | | | ● | | ● | | ● | | | ● |
| V1 | ◉ | | | ● | | ● | ● | | | | ● |
| V2 | | ◉ | | ● | | ■ | ● | | | | ● |
| V3 | ◉ | | | ● | | ● | ● | | ● | | |
| V4 | | ◉ | | ● | ● | | ● | | ● | | |
| V5 | ◉ | | | ■ | ● | | ● | | ● | | |
| V6 | | ◉ | ● | | | ● | ● | | ● | | |
| V7 | ◉ | | ● | | ● | | ● | | ● | | |

Fig. 10

TWIN-CLUTCH TRANSMISSION

This is a Continuation-In-Part Application of International Application PCT/EP2004/005920 filed Jun. 1, 2004 and claiming the priority of German application 103 25 647.4 filed Jun. 6, 2003.

BACKGROUND OF THE INVENTION

The invention relates to a twin-clutch transmission with a number of a load-shiftable forward gears and at least one reverse gear and two co-axial shafts connected to the twin clutches.

A generic twin-clutch transmission is known from the publication DE 198 60 251 C1. Further twin-clutch transmissions are known, for example, from the publications WO 00/39484, U.S. Pat. No. 6,250,171, DE199 39 334, DE 198 21 164, DE 10108881, DE 10102028, U.S. Pat. No. 6,427,547, DE 10015336 and the publication by Tenberge, P.: "Doppelkupplungsgetriebe in Windungsanordnung" ["Twin-clutch transmissions in winding arrangement"], VDI Seminar No. 31 03 01 "Stufenlose Fahrzeuggetriebe" ["Continuously variable vehicle transmissions"], Stuttgart, 2001.

It is the object of the present invention to provide a compact twin-clutch transmission.

SUMMARY OF THE INVENTION

In a twin-clutch transmission, in a first forward gear, the drive torque is transferred by an interconnection of a first transmission part having one countershaft and a second part transmission having another countershaft by means of an intermediate stage whose gearwheels can be used multi-functionally in connection with additional forward gears of the transmission thereby providing for a relatively small transmission with a relatively large number of transmission ratios.

A twin-clutch transmission is equipped with N (in particular, sequentially) load-shiftable forward gears and at least one reverse gear and has two intermediate shafts which are arranged coaxially with respect to one another and to a transmission axis. By a twin clutch, the intermediate shafts can be brought into drive connection in each case with an input shaft, one intermediate shaft being designed as a hollow shaft. As compared with a form of construction with intermediate shafts not arranged coaxially with respect to one another, for example according to the publication U.S. Pat. No. 6,427,547 B1, the invention has the advantage of a small radial overall size, particularly in the region of the clutches, that is to say in the front part region of the transmission. This may be advantageous, for example in terms of integrating the transmission into a vehicle tunnel or for achieving a necessary ground clearance of the motor vehicle.

Furthermore, the twin-clutch transmission according to the invention has two countershafts. These are arranged parallel to one another and parallel to the transmission axis. In comparison with a design having two countershafts which are arranged coaxially with respect to one another and one of which is designed as a hollow shaft, cf., for example, WO 00/39484, the design according to the invention results in an axially relatively short construction.

An input shaft of the twin-clutch transmission and a transmission output shaft are in each case arranged coaxially with respect to the transmission axis. An axial offset can thereby be avoided.

For at least one forward gear A, four step-up stages are interposed between the input shaft and the transmission output shaft. The overall step-up to the transmission output shaft is therefore obtained from the product of the four individual step-up stages. For at least one further forward gear stage B, only two step-up stages are interposed between the input shaft and the transmission output shaft. For at least one forward gear A and one forward gear B, the force flux takes place via (at least) one identical gearwheel. According to the invention, therefore, one gearwheel is multi-functional, with the result that construction space requirements and/or the number of necessary components are reduced. Alternatively or additionally, improved possibilities with regard to the staging of the forward gears are afforded. In particular, a version with relatively short transmission shafts is possible, so that, under load, lower shaft flexions occur or the shaft cross sections have a smaller dimensioning, as compared with other transmission arrangements. The load on the rolling bearings supporting the transmission shafts is likewise reduced as a result of a shortening of the lever arms for support.

The at least one forward gear A is a first forward gear (or the first forward gears) for which four step-up stages are interposed between the input shaft and a transmission output shaft. According to the invention, via the additional two step-up stages for implementing the first forward gear which are interposed in this way in the first gear stage, an additional step-down can be implemented. As a result, the first input stage of the transmission, that is to say a first step-up stage between intermediate shaft and counter-shaft, can be designed to be relatively "long". This has, in particular, the following advantages:

The torque introduced into the countershaft by means of the first input stage is lower than if a relatively short input step-up were used. This has advantages in terms of the dimensioning of the components involved.

Where an odd number of forward gears is concerned, the highest forward gear is assigned to the same input stage as the first forward gear. With the first input stage being designed to be long, the transmission stage for implementing the highest gear can be designed to be relatively "short", or else a particularly long overall step-up can be achieved in the highest gear.

According to a preferred embodiment of the twin-clutch transmission, for the at least one forward gear A with four interposed step-up stages, two gearwheels, which are connected (or connectable) to one another fixedly in terms of rotation, are interposed into the force flux between the input shaft and transmission in output shaft. The gearwheels rotate about the (main) transmission axis. In a forward gear A, one of the abovementioned gearwheels assumes the drive torque from one countershaft, while the other gearwheel transfers the drive torque to the other countershaft. Thus, in particular, in the forward gear A, a transfer of the drive torque from an intermediate shaft to one countershaft, to the gearwheels, to the other countershaft and to the output shaft takes place, in each case with a transmission stage being interposed. Thus, according to the invention, the two part transmissions formed by the respective counter-shafts are introduced in succession into the force flux.

In at least one further forward gear B, at least one of the abovementioned gearwheels transfers the drive torque directly, that is to say with a transmission stage formed by this gearwheel being interposed, from an intermediate shaft to a countershaft, from which the drive torque is transferred to the transmission output shaft via a further transmission stage. The gearwheels connected to one another thereby form a multiply usable intermediate stage. A particularly advantageous embodiment arises when, in a further forward gear B, the other of the abovementioned gearwheels transfers the drive torque directly, that is to say with a transmission stage formed by this gearwheel being interposed, from the same intermediate shaft to the same or the other countershaft.

According to a further embodiment of the invention, the twin-clutch transmission has a forward gear which is designed as a direct gear. This is, in particular, the prepenultimate, the penultimate or the last forward gear. Improvements in efficiency can thereby be achieved.

In a preferred twin-clutch transmission, the input step-up assigned to the lowest forward gear is designed to be longer than the other input step-up. This has advantages when the highest gear stage is an odd gear, for example a seventh gear. In this case, the transmission stage, following the input step-up, for implementing the seventh gear may be designed to be longer. In particular, the input step-up designed to be longer is arranged nearer to the twin clutch than the other input step-up. Because of the relatively large diameter of the gearwheel which corresponds to the input step-up, the intermediate shaft assigned to the other gearwheel may advantageously be relatively far under the gearing for the input step-up gears.

According to the invention, the twin-clutch transmission has, in particular, at least seven gears which are shiftable via four shift elements. This results, as compared with the prior art, in a reduction in the number of shift elements, this being accompanied by a reduction in the weight, in the components required, in the construction space and/or in the costs.

Preferably, one of the abovementioned gearwheels is helically toothed with an angle $\alpha$. The other gearwheel is helically toothed with an angle $\beta$. The angles $\alpha$ and $\beta$ have identical signs and are dimensioned such that the axial forces acting on the two gearwheels in the first forward gear approximately cancel one another. Necessary bearing forces for the gearwheels or a hollow shaft supporting the gearwheels can thereby be reduced, which, for example, leads to a smaller dimensioning and/or increased running time.

In a particular embodiment, the twin-clutch transmission has a shift element which has its neutral position in an outer shift position, in a first shift position connects an intermediate shaft to the transmission output shaft, so that a direct gear is formed, in a second shift position connects the abovementioned gearwheels to the transmission output shaft, and, in a third shift position, makes no connection between assigned transmission elements, the second shift position lying between the first shift position and the third shift position. An outer shift position of the shift element thus forms a "neutral position". Preferably, the abovementioned gearwheels are connected fixedly in terms of rotation to the assigned intermediate shaft via the same shift element in the first shift position. A simple power shift from the direct gear to an adjacent gear thereby becomes possible.

Preferably, the two countershafts and the transmission axis are arranged triangularly in cross section. This affords an especially compact type of construction, particularly a small extent of the twin-clutch transmission transversely with respect to the transmission axis.

The invention will become more readily apparent from the following description of the invention on the basis of the accompanying drawings, wherein preferred exemplary embodiments of the twin-clutch transmission according to the invention are explained in more detail with reference to the drawing:

DESCRIPTION OF PREFERRED EMBODIMENTS

Figure 1:
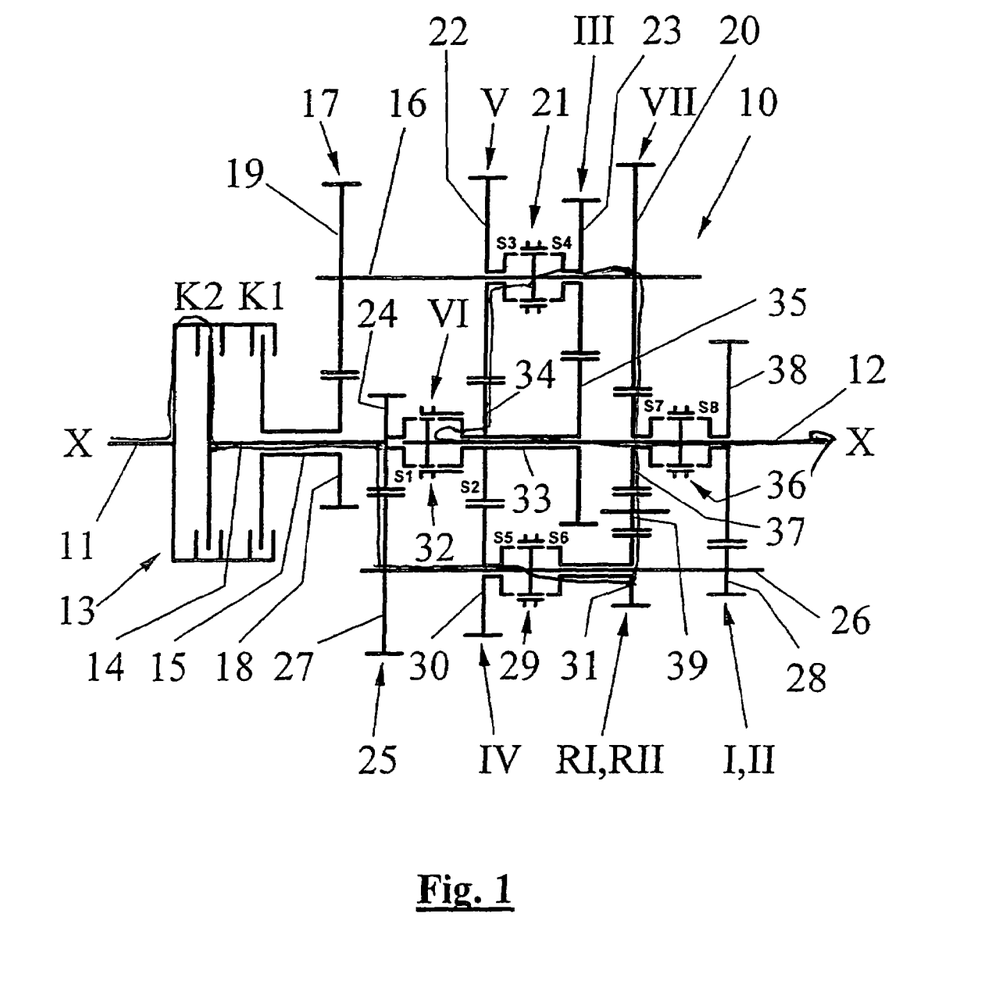
FIG. 1 shows a gear arrangement of a twin-clutch transmission according to a first embodiment.

A twin-clutch transmission 10 according to the invention is used in a drive train of a motor vehicle. In this case, the twin-clutch transmission 10 is interposed between a drive assembly and an output shaft, for example a propeller shaft or cardan shaft. The drive train is preferably a standard drive train with a drive assembly, which is frontmounted lengthways in a vehicle, and drives the rear wheels of the vehicle.

The twin-clutch transmission has an input shaft 11, in particular a crankshaft or a shaft rotating with the latter, and a transmission output shaft 12. The input shaft 11 and the transmission output shaft 12 are arranged coaxially with respect to transmission axis X-X. The input shaft 11 is connected to a drive assembly, if appropriate with at least one further transmission stage being interposed. The transmission output shaft 12 is connected to vehicle wheels, if appropriate with at least one further transmission stage being interposed.

The input shaft 11 is drive-connected to a twin clutch 13, designed here as a structural unit. The twin clutch 13 has a clutch K1 and a clutch K2 which, via suitable devices, not illustrated, and ensuring a suitable overlap control, transfer the drive torque of the input shaft 11 to the intermediate shaft 14, with a clutch K2 closed, and to the intermediate shaft 15, with a clutch K1 closed. The clutch K1 is arranged, in the direction of the transmission axis X-X (hereafter "in the axial direction"), on that side of the clutch K2 which faces away from the drive assembly. The intermediate shaft 15 is a hollow shaft and the solid intermediate shaft 14 extends through the hollow intermediate shaft 15. In that end region of the intermediate shaft 15 which faces away from the twin clutch 13, the drive torque is transmitted from the intermediate shaft 15 to a countershaft 16 via a gear structure 17 which forms an input step-up and has a driving gearwheel 18 connected fixedly for rotation with the intermediate shaft 15 and also a driven gearwheel 19 connected firmly for rotation with the first countershaft 16.

A driving gear 20 of a gear stage VII is connected fixedly for rotation with the first countershaft 16. Via a shift element 21, the countershaft 16, in a shift position S3, is connected for rotation with a driving gear 22 of a gear stage V and, in a shift position S4, is connected to a driving gearwheel 23 of a gear stage III. In a neutral position between the shift positions S3 and S4 the first countershaft 10 independent of the driving gearwheels 20, 22.

In an end region, projecting out of the hollow intermediate shaft 15, the inner intermediate shaft 14 is connected fixedly in terms of rotation to a driving gear 24 of a gear structure 25 which forms the input step-up between the inner intermediate shaft 14 and a second countershaft 26. The driven gear 27 of the gear structure 25 and a driving gear 28 of the gear stages I, II are connected for rotation with the second countershaft 26. Via a shift element 29, a driving gear 30 of a gear stage IV is connected to the second countershaft 26 in a shift position S5 and a driving gear 31 of a gear stage RI, RII is connected to the countershaft 26 in a shift position S6, while, in a neutral position lying between the shift positions S5 and S6, the driving gearwheels 30, 31 are rotatable relative to the second countershaft 26.

A shift element 32 is disposed between the inner intermediate shaft 14, the transmission output shaft 12 and a hollow shaft 33 receiving the transmission output shaft 12. In a shift position S1, the shift element 32 rotationally interconnects the intermediate shaft 14, the transmission output shaft 12 and the hollow shaft 33. In a middle position, the shift element 32 rotationally interconnects the hollow shaft 33 and the transmission output shaft 12. In a shift position S2, there is no drive connection between the intermediate shaft 14, the transmission output shaft 12 and hollow shaft 33. The hollow shaft 33 carries the gearwheel 34 which is assigned to the gear stage V and, offset in the circumferential direction, to the gear stage IV and which meshes with the driving gearwheels 22 and 30, and also the gearwheel 35 which is assigned to the gear stage III and which meshes with the driving gearwheel 23.

A shift element 36 is disposed between the transmission output shaft 12 and the gearwheels 37, 38. In a shift position S7, the shift element 36 connects the transmission output shaft 12 to the gearwheel 37. In a shift position S8, the shift element 36 connects the transmission output shaft to the gearwheel 38. In a neutral position lying between the shift positions S7 and S8, the gearwheels 37, 38 and the transmission output shaft 12 have no drive connection via the shift element 36. The gearwheel 38 forms with the driving gearwheel 28 the gear stage I, II. The gearwheel 37, on the one hand, forms with the driving gearwheel 20 the gear stage VII. Furthermore, offset in the circumferential direction with respect to the driving gearwheel 20, the gearwheel 37 meshes with a reverse-gearwheel 39 which, in turn, is drive-connected to the driving gearwheel 31 so as to form the gear stage RI, RII.

In transmission planes which are oriented transversely (hereinafter "radially") with respect to the transmission axis X-X, are arranged axially one behind the other in the following order:

the twin clutch 13,
the gear structure 17 with driving gearwheel 18 and driven gearwheel 19,
the gear structure 25 with driving gearwheel 24 and driven gearwheel 27,
shift element 32,
gear stage V with driving gearwheel 22 and gearwheel 34 and gear stage IV with driving gearwheel 30 and gearwheel 34,
shift elements 29, 21,
gear stage III with driving gearwheel 23 and gearwheel 35 and gear stage RI, RII with driving gearwheel 31, reverse-gearwheel 39 and gearwheel 37,
shift element 36, and gear stage I, II with driving gearwheel 28 and gearwheel 38.

In a second reverse gear, with the clutch K1 open, the clutch K2 is closed. Shift element 32 is in the middle position, shift element 21 is in the shift position S3, shift element 29 is in shift position S6 and shift element 36 is in the neutral position. The force flux runs via the input shaft 11, clutch K2, intermediate shaft 14, driving gearwheel 24, driven gearwheel 27, countershaft 26, shift element 29, driving gearwheel 31, reverse-gearwheel 39, gearwheel 37, driving gearwheel 20, countershaft 16, shift element 21, driving gearwheel 22, gearwheel 34 and shift element 32 to the transmission output shaft 12.

In a first reverse gear, the clutch K2 is closed, shift element 32 is in the middle position, shift element 21 is in shift position S4, shift element 29 is in shift position S6 and shift element 36 is in the neutral position. In this case, the force flux runs via the input shaft 11, clutch K2, intermediate shaft 14, driving gearwheel 24, driven gearwheel 27, countershaft 26, shift element 29, driving gearwheel 31, reverse-gearwheel 39, gearwheel 37, driving gearwheel 20, countershaft 16, shift element 21, driving gearwheel 23, gearwheel 35 and shift element 32 to the transmission output shaft 12.

Figure 3:
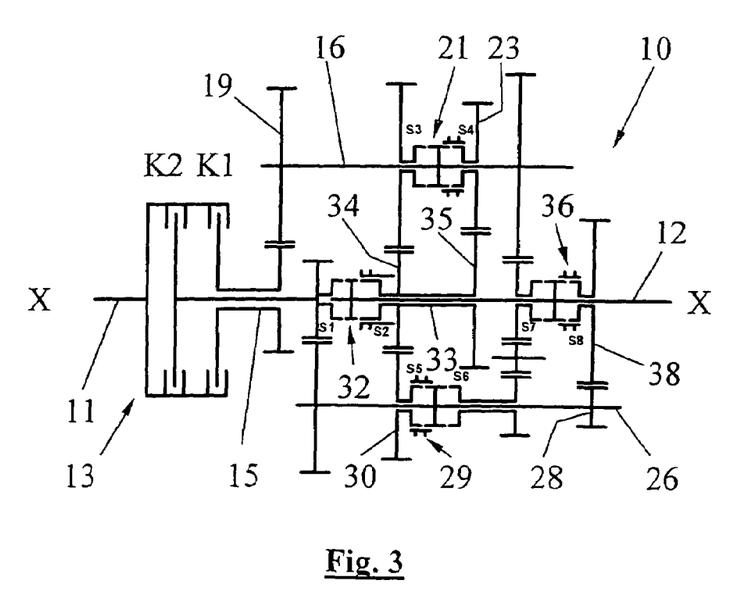
FIG. 3 shows a gear plan of the twin-clutch transmission illustrated in FIG. 1, in a first forward gear.

In a first forward gear, the force flux extends from an input shaft 11 via the clutch K1, the intermediate shaft 15, the driving gear 18, the driven gear 19, the countershaft 16, the shift element 21, the driving gear 23, the gear 35, the hollow shaft 33, the gear 34, the driving gear 30, the shift element 29, the countershaft 26, the driving gear 28, the gear 38 and the shift element 36 to the transmission output shaft 12. The shift element 32 is in shift position S2, the shift element 21 is in shift position S4, the shift element 29 is in shift position S5 and the shift element 36 is in shift position S8 (cf. FIG. 3).

Figure 4:
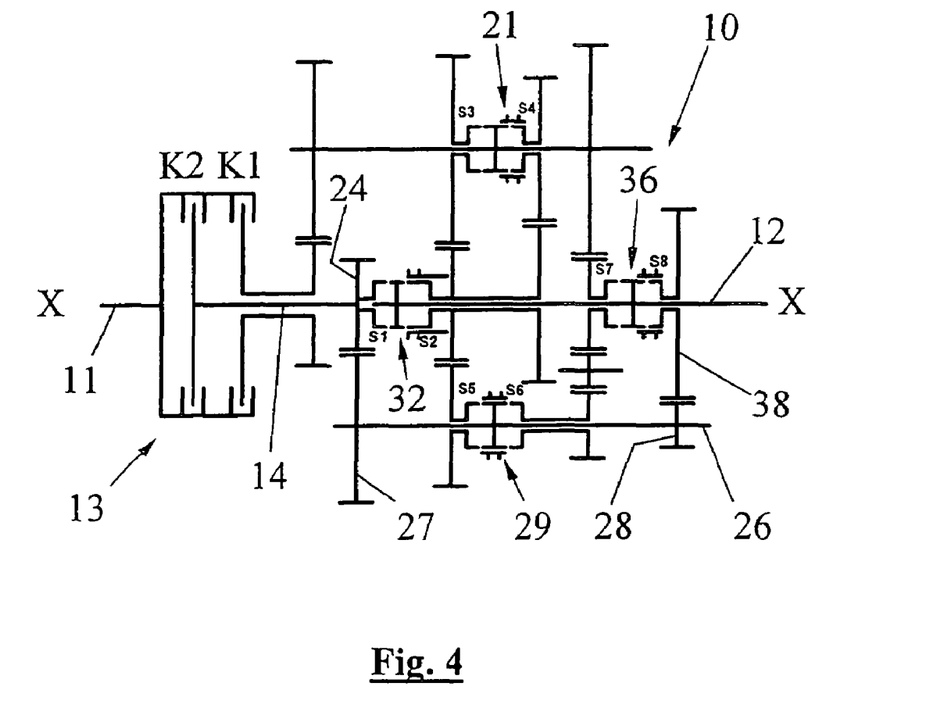
FIG. 4 shows a gear plan of the twin-clutch transmission according to FIG. 1, in a sixth forward gear.

In a second forward gear, the clutch K2 is closed. Shift element 32 is in shift position S2, shift element 21 is in shift position S4, shift element 29 is in the neutral position and shift element 36 is in shift position S8. In the second forward gear, the force flux runs from the input shaft via the clutch K2, intermediate shaft 14, driving gearwheel 24, driven gearwheel 27, countershaft 26, driving gearwheel 28, gearwheel 38 and shift element 36 to the transmission output shaft 12, cf. FIG. 4.

In a third forward gear, the clutch K1 is closed. Shift element 32 is in the middle position, shift element 21 is in shift position S4, shift element 29 is in the neutral position and shift element 36 is in the neutral position. In the third forward gear, the force flux runs from the input shaft 11 via the clutch K1, intermediate shaft 15, driving gearwheel 18, driven gearwheel 19, countershaft 16, shift element 21, driving gearwheel 23, gearwheel 35, hollow shaft 33 and shift element 32 to the transmission output shaft 12.

In a fourth forward gear, the clutch K2 is closed. Shift element 32 is in the middle position. Shift elements 21 and 36 are in the neutral position, while shift element 29 is shifted into shift position S5. The force flux takes place from the input shaft 11 via the clutch K2, intermediate shaft 14, driving gearwheel 24, driven gearwheel 27, countershaft 26, shift element 29, driving gearwheel 30, gearwheel 34 and shift element 32 to the transmission output shaft 12.

In a fifth forward gear, the clutch K1 is closed. Shift element 32 is in the middle position. The shift elements 29 and 36 are in the neutral position, while shift element 21 is shifted into shift position S3. The force flux takes place from the input shaft 11 via the clutch K1, intermediate shaft 15, driving gearwheel 18, driven gearwheel 19, countershaft 16, shift element 21, driving gearwheel 22, gearwheel 34 and shift element 32 to the transmission output shaft 12.

In a sixth forward gear, the clutch K2 is closed. Shift element 32 is in shift position S1, while the shift elements 21, 29 and 36 are shifted into the neutral position. The sixth forward gear is a direct gear for which a force flux takes place from the input shaft via the clutch K2 and intermediate shaft 14 to the transmission output shaft 12 by means of the shift element 32.

In a seventh forward gear, the clutch K1 is closed. Shift element 32 is in shift position S1. The shift elements 21, 29 are in the neutral position, while shift element 36 is shifted into shift position S7. The force flux takes place from the input shaft 11 via the clutch K1, intermediate shaft 15, driving gearwheel 18, driven gearwheel 19, countershaft 16, driving gearwheel 20, gearwheel 37 and shift element 36 to the transmission output shaft 12.

Figure 2:
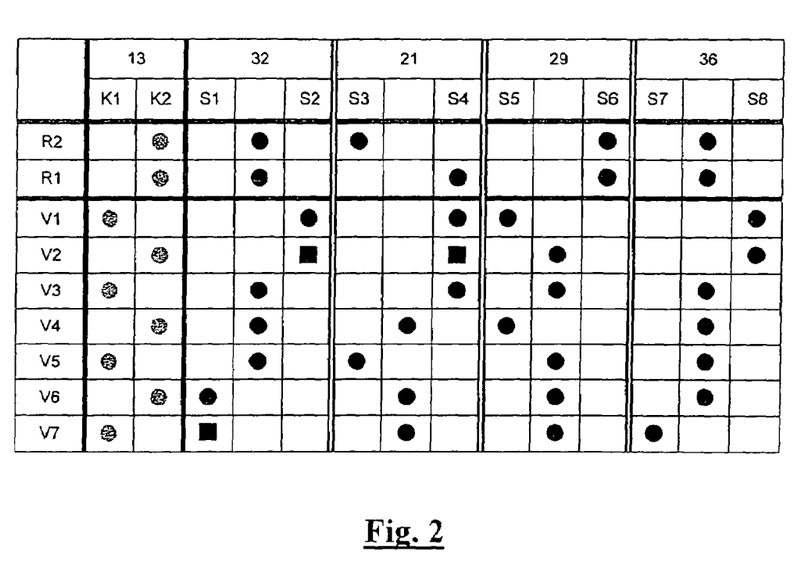
FIG. 2 shows a table of the shift states of the clutches and shift elements for the twin-clutch transmission according to FIG. 1.
Figure 5:
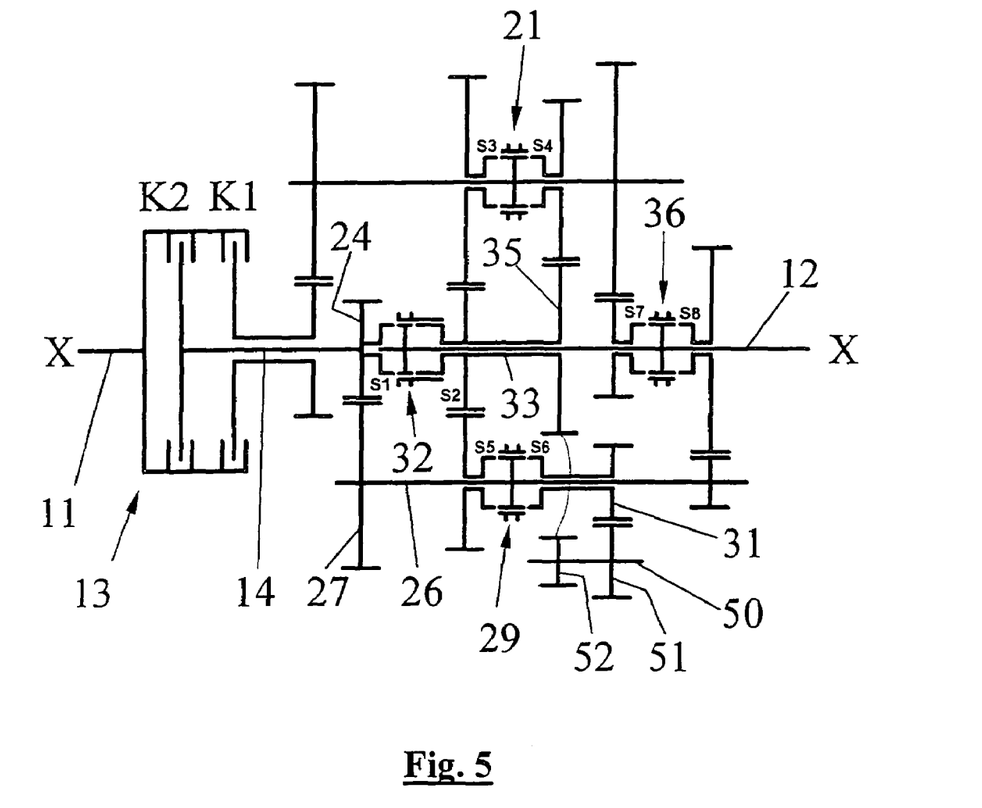
FIG. 5 shows a gear plan of a twin-clutch transmission according to the invention in a second embodiment of the invention.

For the second exemplary embodiment according to FIG. 5, with a design otherwise corresponding to the exemplary embodiment according to FIG. 2 and with corresponding shift positions of the clutch 13 and of the shift elements 21, 29, 32, 36 according to FIG. 2, the reverse-gearwheel 39 is omitted. For this exemplary embodiment, a single reverse gear is implemented, in that a driven gearwheel 51 and a driving gearwheel 52 are mounted fixedly in terms of rotation with respect to an intermediate shaft 50 which extends parallel to the transmission axis X-X and to the countershafts 26, 16. The driven gearwheel 51 meshes with the driving gearwheel 31, while the driving gearwheel 52 meshes with the gearwheel 35.

Figure 6:
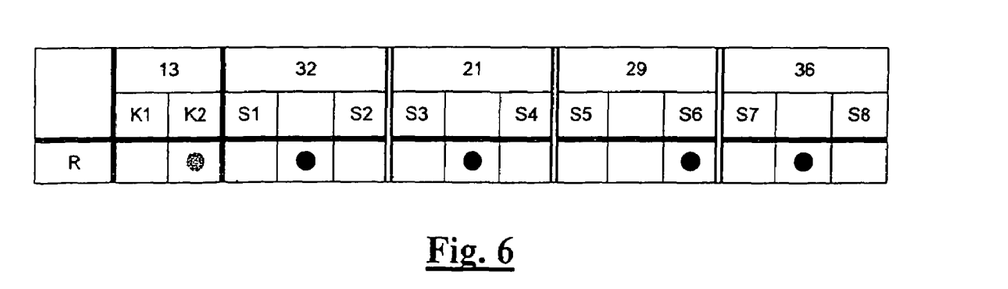
FIG. 6 shows a table of the shift states of the clutches and shift elements for the twin-clutch transmission illustrated in FIG. 5.

For reverse gear, according to the table in FIG. 6, the clutch K2 is closed. Shift element 32 is in the middle position. The shift elements 21, 36 are in the neutral position, while shift element 29 is shifted into shift position S6. In reverse gear, the force flux takes place from the input shaft 11 via the clutch K2, intermediate shaft 14, driving gearwheel 24, driven gearwheel 27, countershaft 26, shift element 29, driving gearwheel 31, driven gearwheel 51, intermediate shaft 50, driving gearwheel 52, gearwheel 35, hollow shaft 33 and shift element 32 to the output shaft 12. With a design otherwise corresponding to the first exemplary embodiment according to FIG. 1, for the third exemplary embodiment according to FIG. 7, a reverse gear is implemented solely via gearwheels which are arranged coaxially with respect to the transmission axis X-X or coaxially with respect to the axes defined by the countershafts 16, 26. For this purpose, the reverse-gearwheel 39 is omitted. The driving gearwheel 31 is offset (with enlarged diameter) out of the transmission plane for the transmission staging VII and RI, RII into a new transmission plane which lies between the transmission plane having the gear stage III and the transmission plane having the gear stage VII and RI, RII. In this transmission plane, the driving gearwheel 31 meshes with a gearwheel 60 which is connected fixedly in terms of rotation to the countershaft 16. The transmission axis X-X and the axes defined by the countershafts 16, 26 are arranged triangularly in cross section (in contrast to the illustration in FIG. 7).

Figure 7:
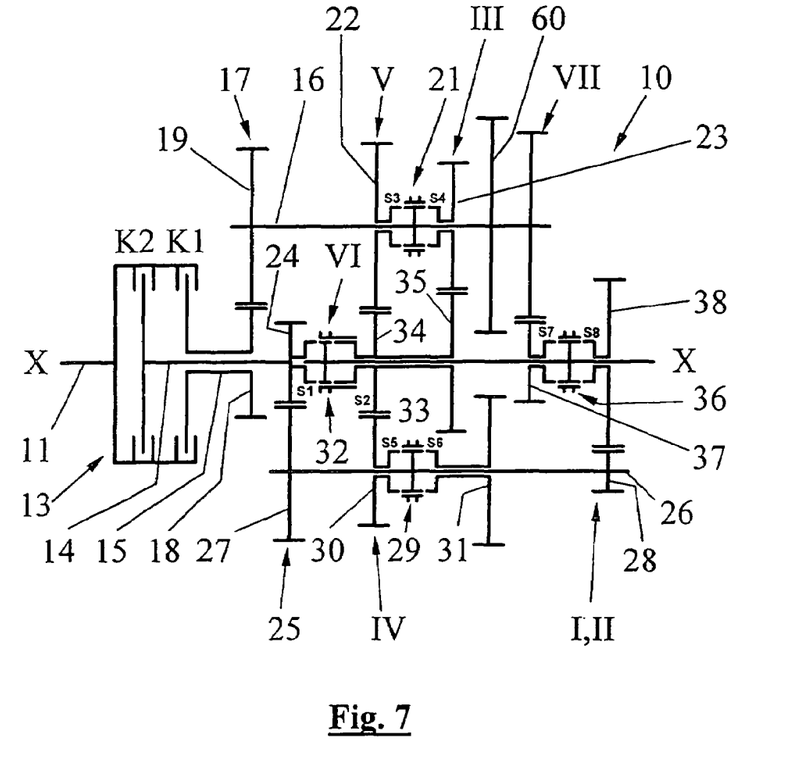
FIG. 7 shows a gear plan of a twin-clutch transmission according to a third embodiment of the invention.
Figure 8:
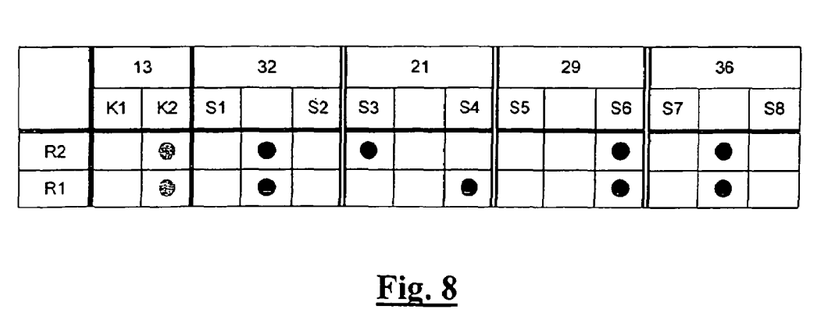
FIG. 8 shows a table of the shift states of the clutches and shift elements of the twin-clutch transmission according to FIG. 7.

In a second reverse gear, the clutch K2 is closed. The shift element 32 is in the middle position. The shift element 39 is in a neutral position, while shift element 39 is shifted into shift position S6 and shift element 21 into shift position S3. The force flux runs, in the second reverse gear, from an input shaft 11 via the clutch K2, intermediate shaft 14, driving gearwheel 24, driven gearwheel 27, countershaft 26, shift element 29, driving gearwheel 31, gearwheel 60, countershaft 16, shift element 21, driving gearwheel 22, gearwheel 34 and shift element 32 to the transmission output shaft 12.

In a first reverse gear, the clutch K2 is closed. The shift element 32 is in the middle position. Shift element 36 is shifted into the neutral position, while shift element 29 is shifted into shift position S6 and shift element 21 into shift position S4. The force flux runs, in the first reverse gear, from the input shaft 11 via the clutch K2, intermediate shaft 14, driving gearwheel 24, driven gearwheel 27, countershaft 26, shift element 29, driving gearwheel 31, gearwheel 60, countershaft 16, shift element 21, driving gearwheel 23, gearwheel 35, hollow shaft 33 and shift element 32 to the transmission output shaft 12.

Figure 9:
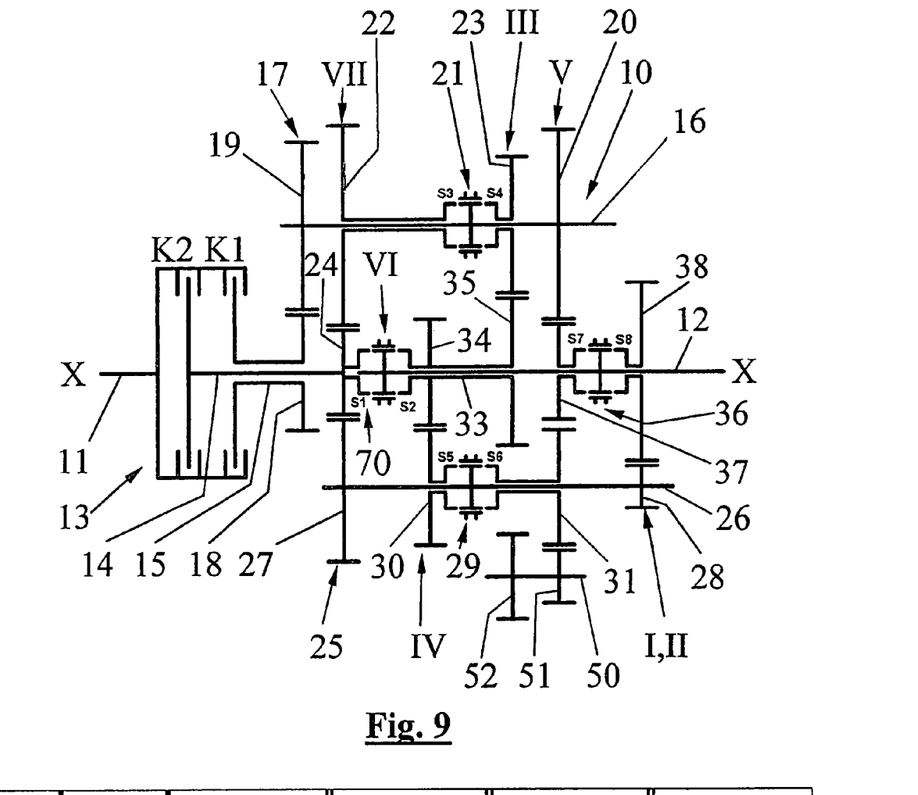
FIG. 9 shows a gear plan of a twin-clutch transmission according to a fourth embodiment of the invention.

Insofar as the description or the illustration in FIG. 9 is not to the contrary, the exemplary embodiment illustrated in FIG. 9 corresponds essentially to the first exemplary embodiment according to FIG. 1 and, in terms of the design of the single reverse gear, to the exemplary embodiment illustrated in FIG. 5 and described. In contrast to this, according to FIG. 9, a shift element 70 is provided instead of the shift element 32. The shift element 70 acts between the intermediate shaft 14 or the driving gearwheel 24, the transmission output shaft 12 and the hollow shaft 33. In a shift position S1, the shift element 70 connects the intermediate shaft 14 directly to the transmission output shaft 12 (direct gear). In the middle neutral position of the shift element 70, the latter is inactive. In the outer shift position S2, the shift element 70 connects the hollow shaft 33 to the transmission output shaft 12. Whereas, according to the exemplary embodiment illustrated in FIG. 1, the gearwheel 34 meshes both with the driving gearwheel 30 and with the driving gearwheel 32, according to the exemplary embodiment illustrated in FIG. 9 the gearwheel 34 meshes solely with the driving gearwheel 30. The driving gearwheel 22 meshes with the driving gearwheel 24 in a transmission plane in common with the driven gearwheel 27. The following transmission planes are thus formed in the following axial order:

twin clutch 13,
constant 17 with gearwheels 18, 19,
constant 25 and gear stage VII with the gearwheels 22, 24, 27,
shift element 70,
gear stage IV with gearwheels 30, 34,
shift elements 29, 21,
gear stage III with gearwheels 23, 25 and the gearwheel 52 assigned to reverse gear,
gear stage V with gearwheels 20, 37 and gearwheels 31, 51 assigned to the reverse gear,
shift element 36,
gear stage I, II with gearwheels 28, 38.

Figure 10:
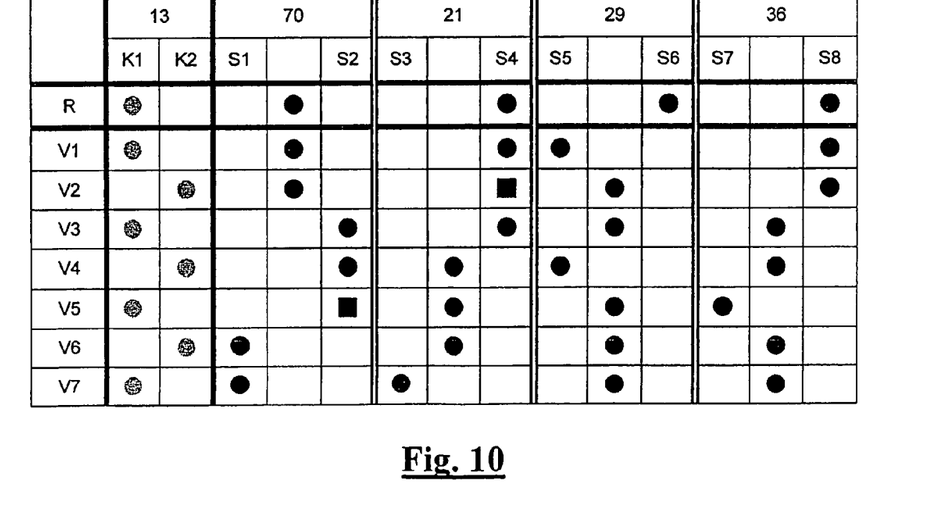
FIG. 10 shows a table of the shift states of the clutches and shift elements of the twin-clutch transmission according to FIG. 9.

According to FIG. 10, in the single reverse gear, the clutch K1 is closed. Shift element 70 is in the neutral position, while shift element 21 is shifted into shift position S4, shift element 29 into shift position S6 and shift element 36 into shift position S8. The force flux takes place from the input shaft 11 via the clutch K1, intermediate shaft 15, driving gearwheel 18, driven gearwheel 19, countershaft 16, shift elements 21, driving gearwheel 23, gearwheel 35, driving gearwheel 52, intermediate shaft 50, driven gearwheel 51, driving gearwheel 31, shift element 29, countershaft 26, driving gearwheel 28, gearwheel 38 and shift element 36 to the transmission output shaft 12.

In a first forward gear, the clutch K1 is closed. The shift element 70 is in the neutral position. Shift element 21 is shifted into shift position S4, shift element 29 into shift position S5 and shift element 36 into shift position S8. The force flux takes place from the input shaft 11 via the clutch K1, intermediate shaft 15, driving gearwheel 18, driven gearwheel 19, countershaft 16, shift element 21, driving gearwheel 23, gearwheel 35, hollow shaft 33, gearwheel 34, driving gearwheel 30, shift element 29, counter-shaft 26, driving gearwheel 28, gearwheel 38 and shift element 36 to the transmission output shaft 12.

In a second forward gear, the clutch K2 is closed. The shift elements 70 and 29 are in the neutral position, shift element 29 is shifted into shift position S4 and shift element 36 into shift position S8. A force flux takes place from the input shaft 11 via the clutch K2, intermediate shaft 14, driving gearwheel 24, driven gearwheel 27, countershaft 26, driving gearwheel 28, gearwheel 38 and shift element 36 to the transmission output shaft 12.

In a third forward gear, the clutch K1 is closed. The shift elements 29, 36 are in the neutral position, while shift element 70 is shifted into shift position S2 and shift element 21 into shift position S4. The force flux takes place from the input shaft 11 via the clutch K1, intermediate shaft 15, driving gearwheel 18, driven gearwheel 19, countershaft 16, shift element 21, driving gearwheel 23, gearwheel 35, hollow shaft 33 and shift element 70 to the transmission output shaft 12.

In a fourth forward gear, the clutch K2 is closed. The shift elements 21, 36 are in the neutral position, while shift element 70 is shifted into shift position S2 and shift element 29 into shift position S5. The force flux takes place from the input shaft 11 via the clutch K2, intermediate shaft 14, driving gearwheel 24, driven gearwheel 27, countershaft 26, shift element 29, driving gearwheel 30, gearwheel 34, hollow shaft 33 and shift element 70 to the transmission output shaft 12.

In a fifth forward gear, the clutch K1 is closed. The shift elements 21, 29 are in the neutral position, while shift element 70 is shifted into shift position S2 and shift element 36 into shift position S7. The force flux takes place from the input shaft 11 via the clutch K1, intermediate shaft 15, driving gearwheel 18, driven gearwheel 19, countershaft 16, driving gearwheel 20, gearwheel 37 and shift element 36 to the transmission output shaft 12.

In a sixth forward gear designed as a direct gear, the clutch K2 is closed. The shift elements 21, 29, 36 are in the neutral position, while shift element 70 is shifted into shift position S1. The force flux takes place, here, from the input shaft via the clutch K2, intermediate shaft 14 and shift element 70 to the transmission output shaft 12.

In a seventh forward gear, the clutch K1 is closed. Shift elements 29 and 36 are in the neutral position. Shift element 70 is shifted selectively into the neutral position or into shift position S1. Shift element 21 is shifted into shift position S3. The force flux takes place from the input shaft via the clutch K1, intermediate shaft 15, driving gearwheel 18, driven gearwheel 19, countershaft 16, shift element 21, driving gearwheel 22, driving gearwheel 24 and shift element 70 to the transmission output shaft 12.

According to FIG. 9, the single reverse gear is designed, similarly to the first gear, as a winding gear, using both part transmissions. A change from the first forward gear to the reverse gear, or vice versa, is made possible only by the actuation of the shift element 29. Contrary to the other embodiments of the invention, according to FIG. 9, only conventional shift elements with a middle neutral position are used. According to the exemplary embodiment illustrated in FIG. 9, all forward gears are power-shiftable sequentially, whereas the transition from the first forward gear to the reverse gear (and vice versa) is not power-shiftable. The stage jumps 1->2 and 3->4 are identical, irrespective of the profile displacement and of a selected axial distance.

The tables according to FIGS. 2, 6, 8 and 10 indicate by squares shift states which are not necessarily required in order to implement the gear specified in each case. However, possibly needless shift movements may be avoided by a selection of the shift state indicated in the tables. Shift positions deviating from the shift positions illustrated are likewise possible.

For all the exemplary embodiments illustrated, diameter and step-up ratios of the twin-clutch transmission may be gathered from the wheel plans in the drawing, in particular the exact diameter ratios,
whether a step-down or a step-up takes place or
whether a step-up of one transmission stage is designed to be higher or lower than the step-up of another transmission stage.

For the embodiments illustrated, as an additional intermediate stage in the first forward gear, the gear stages of the third and the fourth forward gear (the latter in reverse direction) are used, which together result in an additional step-down. For this reason, the selected input step-up (constant 17) may be relatively long.

The number s of the (minimum) required shift units for a compact design according to the invention is calculated from a number N of forward gears on the following principle:

if N is odd, then $$s=(N+1)/2;$$

if N is even, then $$s=(N+2)/2.$$

The shaft axes illustrated may be arranged in one plane or else in a spatial arrangement, in particular in a triangular arrangement.

What is claimed is:
1. A twin clutch transmission for a motor vehicle with
a) at least seven forward gears which are shiftable under load and at least one reverse gear, comprising:
b) two concentric intermediate shafts (14, 15) which are arranged co-axially with a transmission axis (X-X) and which can be engaged selectively with an input shaft (11) via a twin clutch (13) including first and second clutches K1, K2, one of the intermediate shafts (15) being a hollow shaft connected to the first clutch K1 and, the other (14) extending through the hollow shaft (15) and being connected to the second clutch (K2),
c) first and second countershafts (16, 26) arranged parallel to the transmission axis (X-X),
d) the input shaft (11) extending coaxially with the transmission axis (X-X),
e) a transmission output shaft (12) extending coaxially with the transmission axis (X-X),
f) the transmission including four interim transmission stages for establishing at least a lowest forward gear between the input shaft (11) and the output shaft (12) and
g) for establishing at least a second lowest forward gear only two transmission stages being disposed between the input shaft (11) and the output shaft (12), and
h) for at least the lowest forward gear and the second lowest forward gear the power being transmitted via at least one identical gear (28, 38), the lowest forward gear in the power path between the transmission input shaft (11) and the transmission output shaft (12) including two interconnected gears (34, 35) which are rotatable together about the transmission axis (X-X), in the lowest forward gear one (35) of the interconnected gears (34, 35) receiving the drive torque from one counter shaft (16) and the other gear (34) transmitting the drive torque to the other countershaft (26), and in another forward gear at least one of the interconnected gears (34, 35) transmitting the drive torque between a countershaft (16,

26) and the transmission output shaft (12) which extends co-axially with the transmission axis (X-X).

2. A twin clutch transmission according to Claim 1, wherein the interconnected, gears (34, 35) are interconnected for joined rotation by a hollow shaft (33) through which the transmission output shaft (12) extends.

3. A twin clutch transmission according to claim 1, wherein one of the forward gears is a direct drive gear.

4. A twin clutch transmission according to claim 1, wherein an input gear structure (17) assigned to the lowest forward gear and connected to the first clutch (K1) has a longer transmission gear ratio than another input gear structure (25) connected to the second clutch (K2) and assigned to the second lowest forward gear.

5. A twin clutch transmission according to claim 1, wherein at least one of the, interconnected gears (34, 35) is a helical gear with a tooth angle $\alpha$ and the other is a helical gear with a tooth angle $\beta$, wherein both angles $\alpha$ and $\beta$ have the same sign arid are so dimensioned that the axial forces effective on the two gears in the first forward speed are about the same and oppositely directed so that they cancel each other.

6. A twin clutch transmission according to claim 1, wherein an additional intermediate gear (39) is provided for reverse operation.

7. A twin clutch transmission according to claim 1, wherein an additional countershaft (50) is provided for reverse operation.

8. A twin clutch transmission according to claim 1, wherein the stage jump 1->2 and 3->4 are identical.

9. A twin clutch transmission according to claim 1, wherein the gears 1 to 4 are spaced geometrically and the gears 4 to to 7 are progressively spaced.

10. A twin clutch transmission according to claim 1, wherein the two interconnected gears (34, 35) are included in gear stages for the third and fourth forward gears.

11. A twin clutch transmission according to claim 1, wherein the at least seven forward gears are shiftable by four shifting elements (21, 29, 32, 36).

\* \* \* \* \*